United States Patent
Flynn et al.

(10) Patent No.: US 6,304,332 B1
(45) Date of Patent: Oct. 16, 2001

(54) PRECISION GRATING PERIOD MEASUREMENT ARRANGEMENT

(75) Inventors: Edward Joseph Flynn, Summit, NJ (US); Jerome Levkoff, Sinking Spring, PA (US); John William Stayt, Jr., Schnecksville, PA (US); Frank Stephen Walters, Kutztown, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/505,787

(22) Filed: Feb. 17, 2000

(51) Int. Cl.$^7$ .................................................. G01B 11/00
(52) U.S. Cl. ...................... 356/625; 356/499; 356/496; 356/636; 356/521
(58) Field of Search .................................. 356/499, 496, 356/636, 521, 488, 330, 625

(56) References Cited

U.S. PATENT DOCUMENTS

| | | |
|---|---|---|
| 5,361,137 | 11/1994 | Aton et al. . |
| 5,594,592 * | 1/1997 | Harlamoff et al. .................. 359/330 |
| 5,909,281 | 6/1999 | Bruning et al. . |
| 5,973,786 * | 10/1999 | Yoon et al. ............................ 356/354 |

FOREIGN PATENT DOCUMENTS

| | | |
|---|---|---|
| 5-37472 | 2/1993 | (JP) . |
| 7-327012 | 12/1995 | (JP) . |
| 10-104461 | 4/1998 | (JP) . |

OTHER PUBLICATIONS

Japanese Office Action dated Jan. 4, 2000 with partial translation.

* cited by examiner

Primary Examiner—Frank G. Font
Assistant Examiner—Roy M. Punnoose
(74) Attorney, Agent, or Firm—Wendy W. Koba

(57) ABSTRACT

A precision grating period measurement system uses a pair of properly positioned photodetectors to provide sub-Angstrom resolution. That is, the absolute position of a first detector with respect to a zero point in the measurement system is assured by including a second photodetector that measures a retroreflected signal. The system is then "zeroed" on the retroreflected signal such that the subsequent measurements recorded by the first photodetector are a precise measurement of the grating period.

10 Claims, 3 Drawing Sheets

PRECISION GRATING PERIOD MEASUREMENT ARRANGEMENT

TECHNICAL FIELD

The present invention relates to an arrangement for measuring the period of etched gratings or resist profile gratings and, more particularly, to a retroreflection system capable of accurately measuring sub-Angstrom grating periods.

BACKGROUND OF THE INVENTION

Periodically corrugated surfaces (gratings) are widely used in many different optoelectronic devices. For example, a surface grating structure can be used to provide a feedback path for distributed feedback (DFB) and distributed Bragg reflector (DBR) lasers. Externally modulated laser (EML) structures also employ a grating structure. Such state-of-the-art devices are currently being deployed in dense wavelength division multiplex (DWDM) systems that require channel spacing of approximately 0.8 nm. This extremely narrow spacing translates into a 7 Å period difference between transmission channels.

During the manufacturing process, it is important to be able to measure the grating periodicity to ensure that the proper channel spacing is obtained. Current measurement arrangements rely on diffraction techniques and require operator judgement for both set-up and calibration of each measurement. In many systems, Ar ion gas lasers are used to generate the needed UV laser beam. These lasers are large and expensive to maintain.

Thus, a need remains in the art for a grating measurement arrangement that is suitable for the manufacturing environment and is capable of providing accurate measurements of sub-Angstrom grating periods.

SUMMARY OF THE INVENTION

The need remaining in the prior art is addressed by the present invention, which relates to an arrangement for measuring the period of etched gratings or resist profile gratings and, more particularly, to a retroreflection system capable of accurately measuring sub-Angstrom grating periods.

In accordance with a preferred embodiment of the present invention, a precision grating period measurement arrangement includes a pair of signal detectors that are positioned relative to one another in a manner such that a "system zero" point is maintained during the measurement process. A Q-switched pulsed solid state laser is used to generate the UV light required for the measurement. The pulses are synchronized to a lock-in reference amplifier. The device being measured is held in a rotary positioner with 1 arc sec resolution, the positioner being the only movable object in the system. A predefined algorithm is used to zero in on the start point based on a fitted peak detection algorithm. The output of the pulsed laser is directed at the device to be measured, where the diffracted output beam is directed toward a first detector. A reflected beam from the device is re-directed into a second detector. By knowing the absolute position of the first detector with respect to the "zero" point in the measurement system, accuracy and repeatability is maintained. The retroflection of the beam into the second detector is used to generate this zero point.

In an alternative use of the present invention, unknown grating periods can also be automatically measured by performing a full scan across the wafer being measured.

Other and further features of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
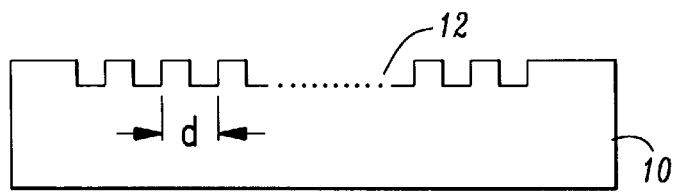
FIG. 1 illustrates an exemplary grating structure that can be analyzed using the system of the present invention.

As mentioned above, typical channel spacing for DWDM type devices require channel spacing of 1 nm or less with high repeatability. For example, devices such as DFB lasers require channel spacing of 0.8nm. Such a channel spacing translates into a 7 Å period difference between transmission channels. FIG. 1 illustrates a portion of an exemplary DFB laser 10 with a grating 12 having a periodicity d that is less than 200 nm. Conventional measurement techniques are frequently accurate to only 0.5 nm, which is less than the desired measurement precision for state-of-the-art lasers and electro-optical devices.

Figure 2:
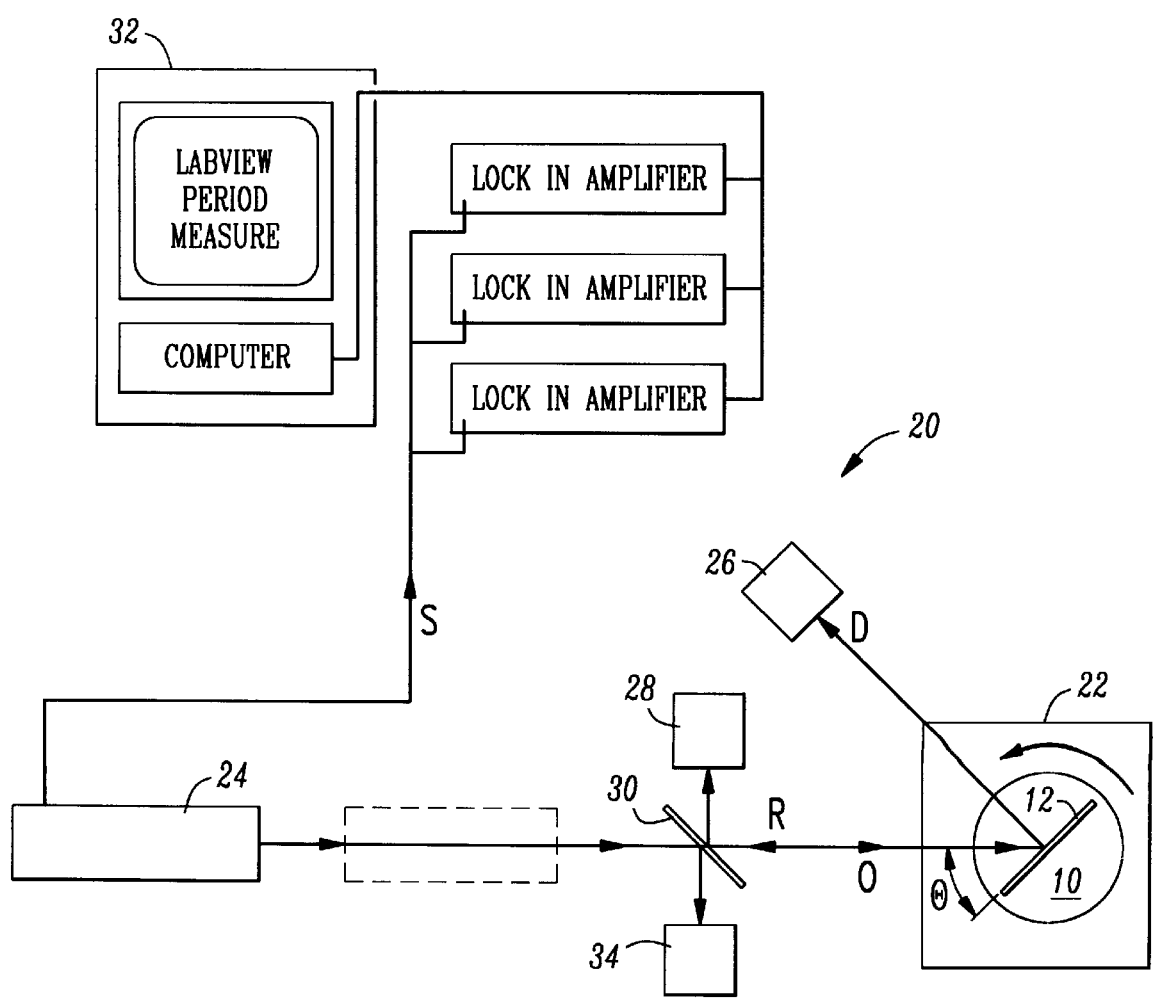
FIG. 2 illustrates an exemplary precision grating period measurement system formed in accordance with the present invention.

FIG. 2 illustrates an exemplary precision grating period measurement system 20 that is capable of providing the sub-Angstrom resolution needed to measure a grating such as grating 12 of FIG. 1. Measurement system 20 includes a mounting fixture 22 for holding the device-to-be-measured (such as a wafer including DFB laser 10), where mounting fixture 22 is a rotary device capable of 1 arc sec resolution. Once such fixture is disclosed in co-pending patent application Ser. No. 09/276/261, filed Mar. 25, 1999 and assigned to the assignee of the present application. A pulsed solid state laser source 24 is used to provide the UV radiation for the grating period measurement. As shown in FIG. 2, pulsed laser source is positioned with respect to rotary mounting fixture 22 such that the output pulses O impinge, for example, grating surface 12 of device 10. The rotation of fixture 22, as indicated by the arrow in FIG. 2 thus determines the incident angle θ of pulses O on grating 12. The incidence of optical pulses O on a grating structure results in forming a diffracted output beam, indicated as "D" in FIG. 2. A first photodetector 26 is positioned to intercept diffracted output beam D produced by grating 12.

Figure 3:
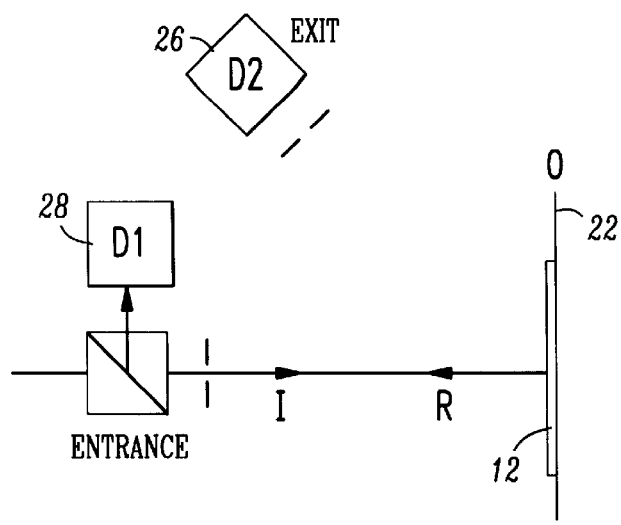
FIGS. 3–5 illustrate three different positions of a grating within the measurement system of the present invention.

In accordance with the present invention, a "system zero" value is obtained by disposing a second photodetector 28 to capture a retroreflected beam R from grating 12, where retroreflected beam R is defined as that reflected beam which follows the same path as the incident beam (as shown in FIG. 2). When the "system zero" is established, grating 12 will be precisely aligned with the incident beam. FIG. 3 illustrates a simplified arrangement of the elements of FIG. 2, illustrating in particular the retroreflection position of the measurement system. Referring back to FIG. 2, a computer-controlled data collector 32 is illustrated and used to preset the starting point of the diffracted beam, based on the expected period of the device being measured. Advantageously, the use of such a preset starting point increases the measurement speed and resolution by decreasing the total number of points needed for measurement, while also eliminating the need to scan the full rotation to obtain the grating periodicity. More particularly, retroreflected beam R captured by second photodetector 28 is analyzed by data collector 32 to determine the "zero" point in the measurement system. As described below, fixture 22 is rotated and the diffracted beam is measured by first photodetector 26, where this measurement can then be calibrated with respect to this zero value to obtain the required precise grating period measurement.

A third photodetector 34 may be disposed relative to beam splitter 30, as shown in FIG. 2, so as to capture a portion of the output pulses O from solid state UV laser 24. Third photodetector 34 is used to measure the beam power for normalization purposes with respect to the power recorded by first photodetector 26 and second photodetector 28. Third photodetector 34 may also be used to measure the wavelength of laser 24, for better accuracy in the final measurement process. A laser pulse reference signal S is shown as being coupled between UV laser 24 and a set of three lock-in amplifiers 36, 38 and 40. Reference signal S is used to maintain the output pulses O from UV laser 24 in synchronization with the lock-in amplifiers used to detector the diffracted laser pulses. Advantageously, the use of synchronization removes the need to externally chop the laser beam for detection purposes. Summarizing, the first step in utilizing the measurement system of the present invention is to determine the "system zero", as shown in FIG. 3.

Figure 4:
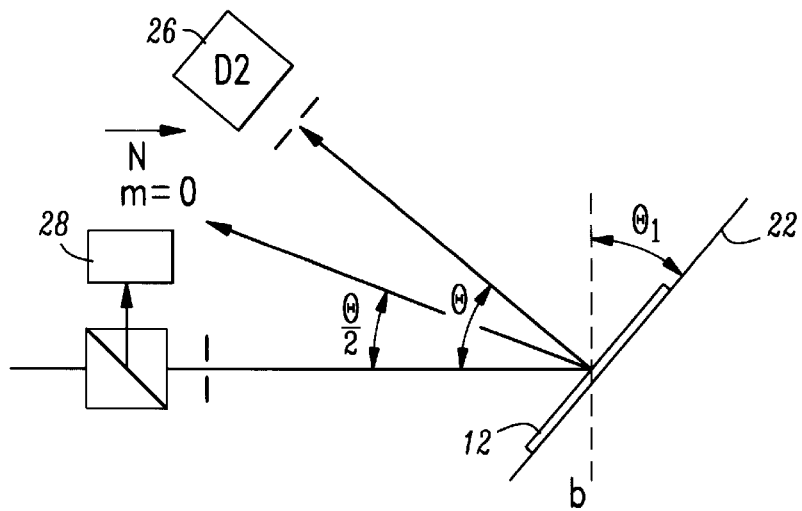

With the system zero now a known quantity, the next step in the process is to determine the angular separation between first photodetector 26 and the "system zero". This process is then repeated for every measurement, thus ensuring that the system of the present invention maintains the required high degree of precision and repeatability. Fixture 22 supporting grating 12 is then rotated through an angle $\theta_1$, as shown in FIG. 4, until the specular reflected beam is intercepted by first detector 26. This rotation corresponds to the zero order (m=0) of the grating equation:

$$d\{\sin\alpha \pm \sin\beta\} = m\lambda,$$

where d is the grating period, $\alpha$ is the incident angle of an incoming beam on the grating, $\beta$ is defined as the angle of the diffracted wavelength, and $\lambda$ is the wavelength of the incoming optical signal. The "+" sign in the above equation is used when $\alpha$ and $\beta$ are on the same side as the normal, N, of the grating. The "−" is used when $\alpha$ and $\beta$ are on opposite sides of the normal N. The angle $\phi$ is accurate in determining the precise location of first photodetector 26, based on the "zero" position and the passing of the specular beam onto first photodetector 26.

By rotating fixture 22 through an angle $\theta_2$, the diffracted beam will now be intercepted by first detector 26, corresponding to the first order (m=1) of the grating equation. Referring to FIG. 4, $\alpha$ and $\beta$ are defined above as the incident angle and diffracted angle, respectively, with respect to the normal N of grating 12, where as shown the angles are on same side of N. In this case, the "+" version of the diffraction equation is used, that is:

$$d\{\sin\alpha + \sin\beta\} = m\lambda,$$

where $\lambda$ is defined as the input, known wavelength $\lambda_o$ of the laser beam and m=1. With this information, the grating equation can be re-written to solve for the grating period d as follows:

$$d = \frac{\lambda_0}{\sin\alpha + \sin\beta}$$

Now referring to FIG. 4, $\gamma = \alpha - \beta$, which means that:

$$\beta = \alpha - \gamma.$$

Substituting this relation into the above equation yields the following:

$$d = \frac{\lambda_0}{\sin(\alpha) + \sin(\alpha - \gamma)}$$

For the case of retroreflection as shown in FIG. 3, m=0, $\alpha = \beta = 0$. Referring to FIG. 4, m=0, $\alpha = \beta = \phi/2$. Therefore, $\gamma = \alpha + \beta = \phi/2 = \phi$.

As grating 12 rotates on fixture 22 from the m=0 position to the m=1 position, that is, through an angle $\theta'$, the angle of incidence $\alpha$ will change from $\phi/2$ to $\phi/2 + \theta'$. Then solving for $\beta$ and substituting into the grating equation with the conditions m=1, $\lambda = \lambda_0$, and $\gamma = \phi$ yields the following:

$$d = \frac{\lambda_0}{\sin\left(\frac{\phi}{2} + \theta'\right) + \sin\left(\frac{\phi}{2} + \theta' - \phi\right)}$$

$$= \frac{\lambda_0}{\sin\left(\theta' + \frac{\phi}{2}\right) + \sin\left(\theta' - \frac{\phi}{2}\right)}$$

where $\theta' = \theta_2 - \theta_1$, then the following can be used in accordance with the present invention to solve for the period of an exemplary grating structure:

$$d = \frac{\lambda_0}{\sin\left(\theta_2 - \theta_1 + \frac{\phi}{2}\right) + \sin\left(\theta_2 - \theta_1 - \frac{\phi}{2}\right)}$$

Figure 5:
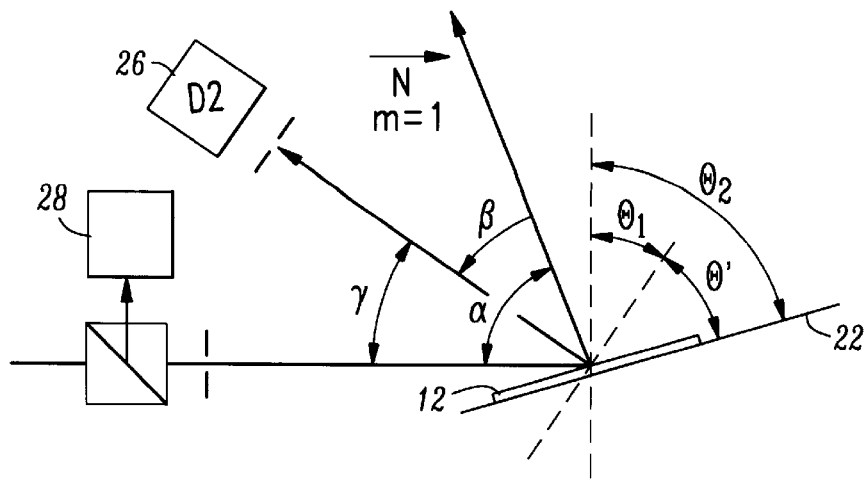

Referring to FIG. 5, the above equation can be used to find an unknown grating period. As mentioned above, a first retroreflection measurement can be used to determine the "system zero", as shown in FIG. 3. For an exemplary arrangement, it can be presumed that the "zero angle" is equal to 123336 arcsecs. The associated (measured) reflected angle is 148815 arcsecs and the diffracted angle is 324475 arcsecs, for a given wavelength $\lambda_0$ of 355 nm (i.e., $355 \times 10^{-9}$m). The zero angle, determined from the retroreflected beam, is then subtracted from both the reflected angle and diffracted angle to normalize these measurements. That is:

$\theta_1$=reflected angle−zero angle=148815−123336=25479 arcsec$\theta$ $_2$=diffracted angle−zero angle=324475−123336=201139 arcsec.

In this case, the angle $\phi$ is determined from $\theta_1$, where $\phi = 2\theta_1$, therefore, $\phi/2 = \theta_1$. Solving the above equation for d yields the following result:

$$d = \frac{355 \times 10^{-9} m}{\sin\left(\frac{201139 - 25479}{3600} + \frac{25479}{3600}\right) + \sin\left(\frac{201139 - 25479}{3600} - \frac{25479}{3600}\right)}$$

$$d = 2377.38 \text{ Å}.$$

While the system as described above is useful in providing precise measurements of grating periods when the expected grating period is known (and thus used as a starting point for the measurement process), the arrangement of the present invention may also be used to measure unknown grating periods. In this case, a full scan across the grating structure is required to ascertain the period and, as such, the measurement will take longer than the prior measurement example discussed above. This particular aspect of the present invention is contained in the "measurement process" flowchart shown in FIG. 6.

Figure 6:
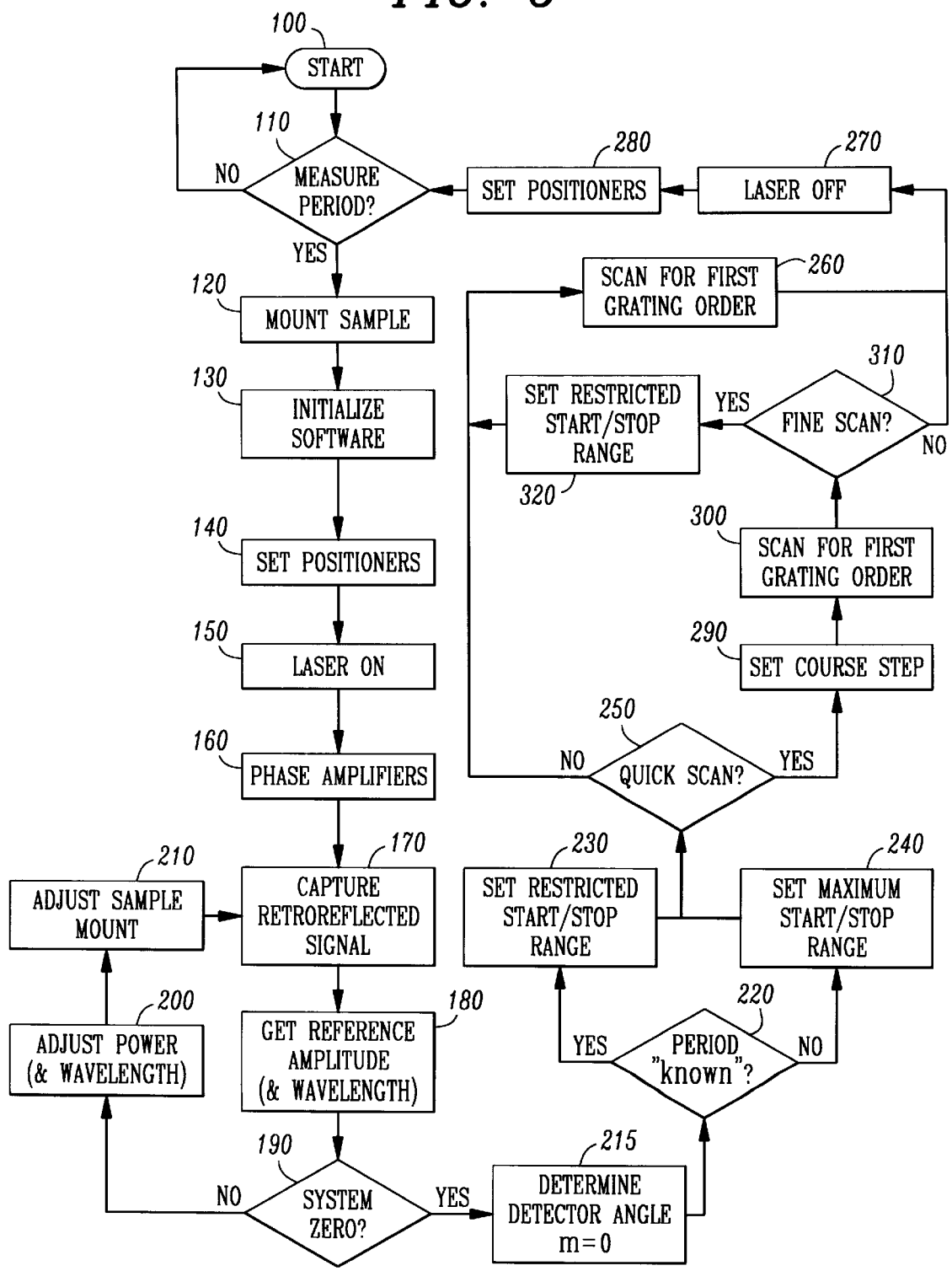
FIG. 6 contains a flowchart illustrating the grating measurement process of the present invention.

Referring to FIG. 6, the measurement process begins at block 100, with a first decision point (block 110) being a query to begin the measurement process. If it is desired to begin the process, the next step (block 120) involves mounting sample 10 to be measured in fixture 22. The system software is then initialized (block 130) and all of the positioners are set (block 140). Subsequent to this, measuring laser 24 is turned "on" (block 150) and the lock-in amplifiers are properly phased (block 160).

The retroreflected beam is then capture by photodector 28 (block 170) and the amplitude (and optionally wavelength) is recorded (block 180). The measured amplitude and wavelength are then evaluated to determine if sample 10 is set at "system zero" (block 190). If the arrangement is not properly registered at the "zero point", the incoming power and (and optionally wavelength) is adjusted (block 200) and the relative position of fixture 22 is adjusted (block 210). The process of measuring "system zero" is then repeated (blocks 170, 180, 190) until the proper zero point is obtained. Once the "system zero" has been defined, the angular separation between the system zero and first detector 26 is determined (block 215).

At this point, the process may either proceed to measure a "known" grating, or scan across an entire range of expected periods to evaluate a grating and determine its period (block 220). For a "known" grating, the measurement process will need to scan only a limited span across the wafer (block 230), while for measuring an "unknown" grating, as stated above, essentially the entire wafer will be scanned (block 240). Subsequent to this, a decision is made whether to perform a "quick" scan (larger separation between measurement points) or a conventional scan (block 250). In the conventional process, the scan proceeds for a first-order grating (block 260) and when finished, turns off the laser source (270) and re-sets the positioners (block 280). If a "quick scan" is used, the size of the measure step is set (block 290) and the scan proceeds for a first-order grating (block 300). If a finer scan is then desired (decision block 310), a new scan range is determined (block 320) and another scan is performed (block 260). Otherwise, the process is completed and the laser source is turned "off" (block 270).

While certain embodiments of the invention have been described and illustrated, the invention is not limited to these specific embodiments as numerous modifications, changes and substitutions of equivalent methods can be made without departing from the spirit and scope of the invention. Accordingly, the scope of the present invention is not limited by the specifics of the particular structures, which have been described and illustrated, but is only limited by the scope of the claims appended hereto.

What is claimed is:

1. Apparatus for measuring the period of a grating structure formed on a semiconductor device, the apparatus comprising a rotatable mounting fixture for holding an optoelectronic device to be measured;

a laser source for providing output pulsed radiation, said laser source disposed with respect to said rotatable mounting fixture such that the output pulsed radiation impinges a grating structure of a mounted optoelectronic device;

a first photodetector disposed to capture a diffracted output beam produced by the interference of the output pulsed radiation with the grating structure;

a second photodetector disposed to capture a retroreflected beam from said grating for determining a starting point for subsequent measurements supplied by the first photodetector;

a plurality of amplifiers coupled to the photodetectors for generating electrical representations of the detector optical signals; and a computer-controlled data collector coupled to the plurality of amplifiers for translating the electrical representations into an associated grating period.

2. A system as defined in claim 1 wherein the plurality of lock-in amplifiers are coupled to the pulsed laser source to as to provide a synchronization signal between the amplifiers and the laser source.

3. A system as defined in claim 1 wherein the system further comprises a beam splitter disposed between the pulsed laser source and the mounting fixture, the beam splitter positioned such that the retroreflected signal from the mounting fixture is directed into the second photodetector.

4. A system as defined in claim 1 wherein the system further comprises a third photodetector disposed to intercept a portion of the pulsed output from the laser and ascertain the power of the pulsed output signal.

5. A system as defined in claim 3 wherein the system further comprises a third photodetector disposed with respect to the beam splitter so as to intercept a portion of the pulsed output from the laser and ascertain the power of the pulsed output signal.

6. A method of measuring the period of a grating formed on a semiconductor device, the method comprising the steps of:

a) mounting a semiconductor device to be measured on a rotatable fixture;

b) providing a laser source, emitting at a predetermined wavelength $\lambda_0$, to illuminate the mounted device;

c) activating said laser source and rotating the position of said mounted device with respect to said laser source to determine a "system zero" point;

d) scanning said mounted with said laser illumination by rotating said mounted device through a predetermined angle $\theta_1$;

e) collecting diffracted light from said mounted device and determining a diffraction angle $\theta_2$; and f) determining a grating period d from the following relation:

$$d = \frac{\lambda_0}{\sin\left(\theta_2 - \theta_1 + \frac{\phi}{2}\right) + \sin\left(\theta_2 - \theta_1 - \frac{\phi}{2}\right)}$$

where $\phi/2 = \theta_1$.

7. The method as defined in claim 6 wherein in performing step d), a scan is performed across a limited range of the mounted device to determine a grating period based on a "known" period.

8. The method as defined in claim 6 wherein in performing step d), a scan is performed across a predetermined range of expected periods to determine a grating period on a device having an unknown grating period.

9. The method as defined in claim 6 wherein in performing step e), a single photodetector is used to capture the diffracted light signal from the mounted device surface.

10. The method as defined in claim 6 wherein in performing step e), a plurality of photodetectors, with a plurality of slit dimensions, is used for improving the resolutions of the grating period measurement.

* * * * *